United States Patent [19]

Kawaguchi et al.

[11] Patent Number: 4,723,785
[45] Date of Patent: Feb. 9, 1988

[54] FRONT SUSPENSION FOR A VEHICLE

[75] Inventors: Takeshi Kawaguchi; Akio Kawano; Kenzi Honma, all of Saitama, Japan

[73] Assignee: Honda Giken Kogyo Kabushiki Kaisha, Tokyo, Japan

[21] Appl. No.: 893,001

[22] Filed: Aug. 1, 1986

[30] Foreign Application Priority Data

| Aug. 1, 1985 | [JP] | Japan | 60-170073 |
| Aug. 18, 1985 | [JP] | Japan | 60-284741 |
| Dec. 12, 1985 | [JP] | Japan | 60-280056 |
| Dec. 20, 1985 | [JP] | Japan | 60-287177 |
| Feb. 21, 1986 | [JP] | Japan | 61-36600 |

[51] Int. Cl.$^4$ .................................................. B62K 25/04
[52] U.S. Cl. ..................................... 280/275; 280/279; 280/771
[58] Field of Search ............... 280/771, 282, 263, 275, 280/276, 279, 284; 180/219, 222

[56] References Cited

U.S. PATENT DOCUMENTS

| 4,388,978 | 6/1983 | Flor | 280/275 |
| 4,526,249 | 7/1985 | Parker | 280/275 |
| 4,531,755 | 7/1985 | Isono et al. | 280/279 |

FOREIGN PATENT DOCUMENTS

| 122161 | 10/1984 | European Pat. Off. . |
| 2418742 | 9/1979 | France . |
| 2447849 | 8/1980 | France . |
| 2121364 | 12/1983 | United Kingdom . |

Primary Examiner—Richard A. Bertsch
Attorney, Agent, or Firm—Lyon & Lyon

[57] ABSTRACT

A front suspension for a vehicle having a pair of swing arms and steering arm. The swing arms are mounted to the steering arm in a manner such that savings in weight and material are realized. The swing arms are pivotally mounted forwardly at upper and lower locations on said steering arm and pivotally mounted rearwardly on the vehicle, said forward mounting location of said upper swing arm being outside the circumference of the front wheel and said forward mounting location of said lower swing arm being above and rearward of the front wheel axle, said upper and lower swing arms extending upwardly from said rearward mounting locations. Accordingly, the front wheel can take a wide steering angle and the swing arm does not become too heavy.

7 Claims, 10 Drawing Figures

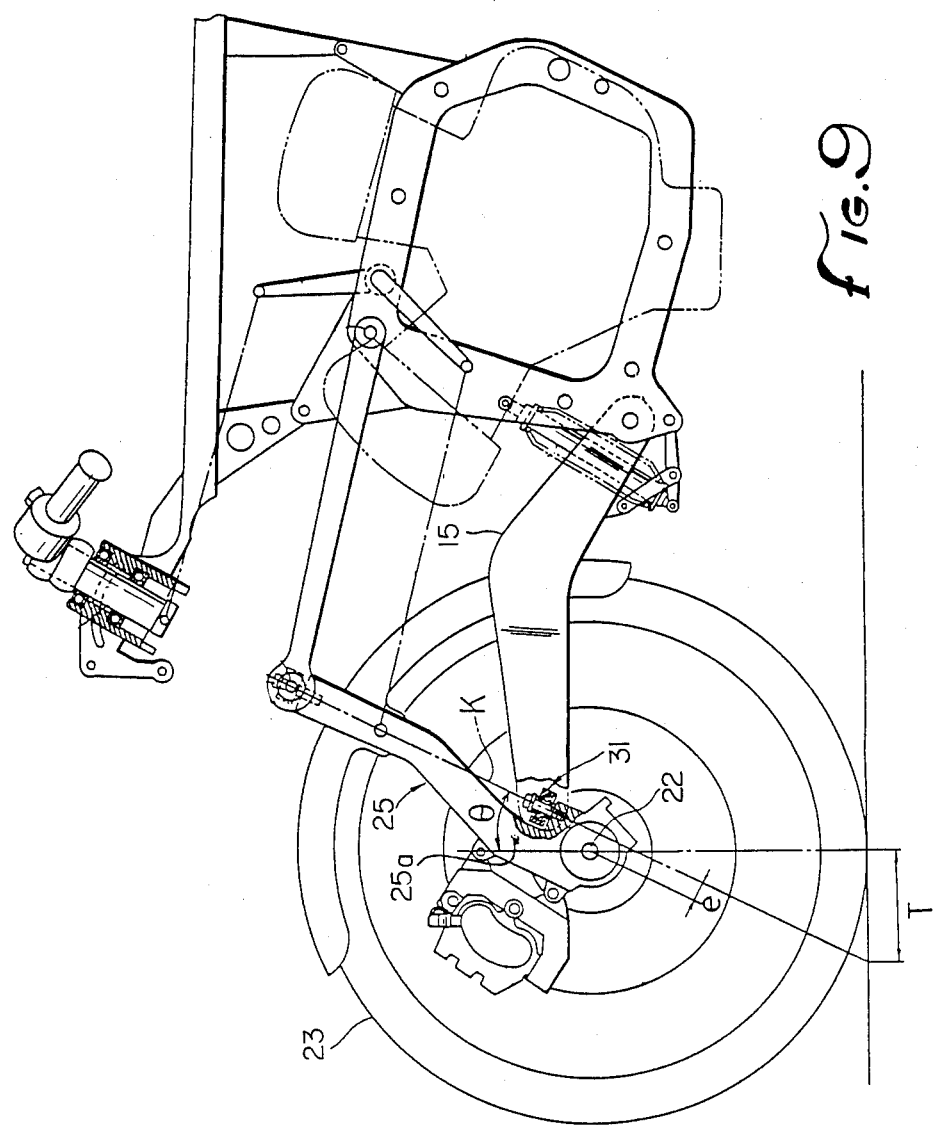

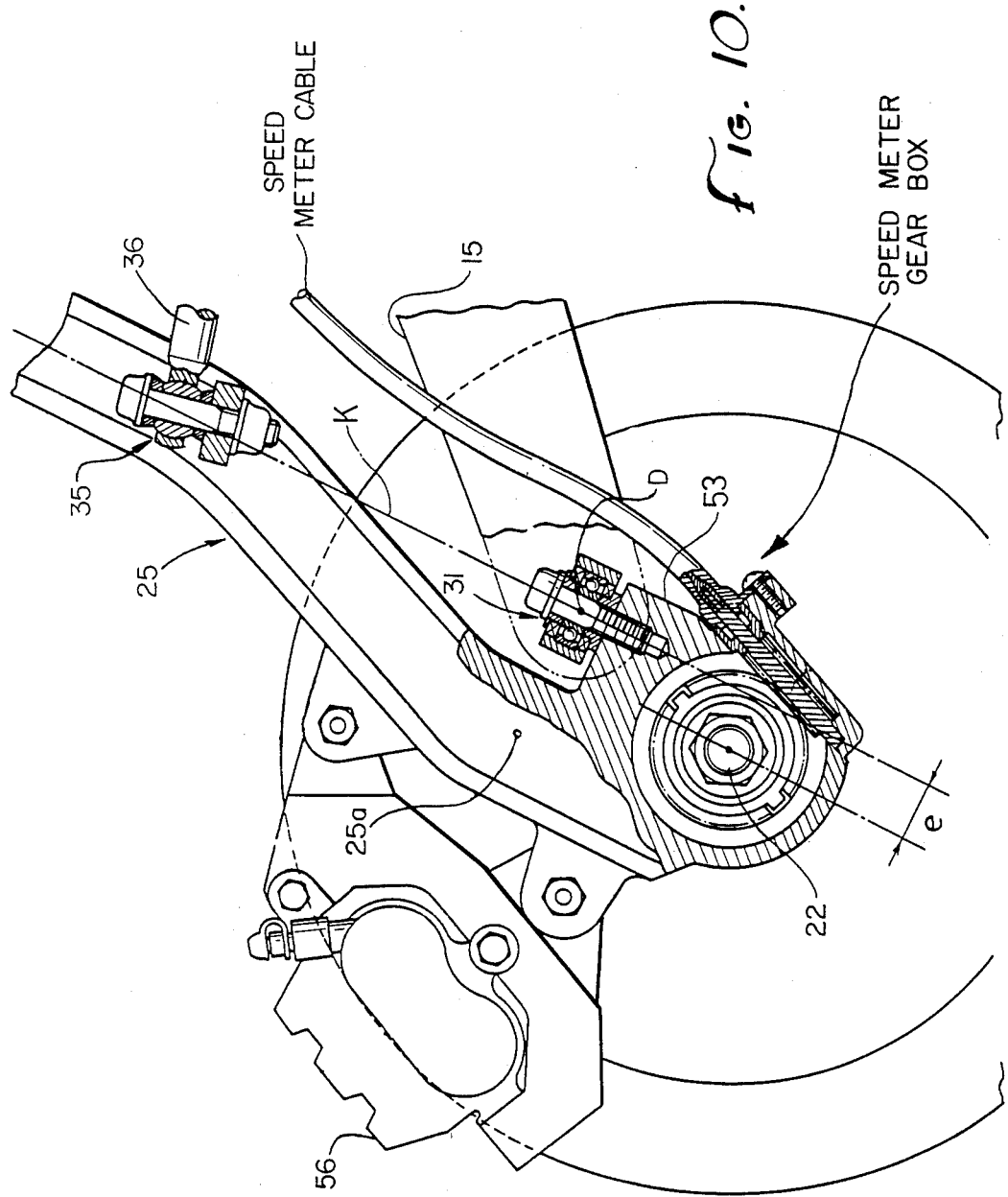

FRONT SUSPENSION FOR A VEHICLE

BACKGROUND OF THE INVENTION

The field of the present invention is suspension systems for vehicles including motorcycles and the like.

In vehicles, particularly single front-wheeled vehicles such as motorcycles, the wheel responsible for steering the vehicle has typically been mounted by means of a front fork extending between a steering member and the wheel axle and comprising some form of damping mechanism. More recently, the concept of the front fork has been abandoned in favor of a pivotal mounting system wherein the wheel is pivotally mounted to the vehicle frame by one or more arm members cooperating with a damping system. In Japanese patent publication No. 58-49435 (No. 49434/1981) and U.S. Pat. No. 4,265,329, a motorcycle is proposed in which this alternative system is employed in order to reduce vehicle weight and lower the center of gravity thereof.

In the motorcycle mentioned above, a wheel support member is attached to upper and lower arm members at locations at the side of the front wheel, within the outer periphery thereof when the front wheel is seen from its side.

In order to provide for changes of direction of the front wheel, it is necessary that the arm members be largely curved away from the wheel so that the arm members and the front wheel do not interfere with each other.

As a result of this, the arms become longer in length, thereby resulting in unnecessary weight. Applicants have discovered that further weight savings and vehicle sturdiness can be achieved.

SUMMARY OF THE INVENTION

The present invention is directed to a suspension system for a vehicle wherein upper and lower arm members are mounted to a steering arm in a manner such that savings in weight and material can be achieved. To this end, upper and lower swing arm members are mounted at selected locations on a steering arm supporting a vehicle wheel such that the degree to which the swing arms must be configured to avoid interference with the wheel during vehicle turning is minimized. Thus a vehicle suspension is provided comprising a steering arm adapted to support an axle of a steerable front wheel and a pair of upper and lower swing arms, said swing arms being pivotally mounted forwardly at upper and lower locations on said steering arm and being pivotally mounted rearwardly on the vehicle, said forward mounting location of said upper swing arm being outside the circumference of the front wheel and said forward mounting location of said lower swing arm being above and rearward of said axle mounting portion of said steering arm and said upper and lower swing arms extend upwardly from said rearward mounting locations. In another aspect of the invention, an improved pivotal mounting arrangement is provided between the swing arms and the steering arm.

BRIEF DESCRIPTION OF THE DRAWINGS

FIG. 9 shows a second aspect of the suspension system of FIG. 2 wherein the steering arm is forwardly offset at the mounting location between the lower swing arm and the steering arm.

FIG. 10 is a detailed view of the suspension system of FIG. 9 with a portion thereof broken away for clarity.

DETAILED DESCRIPTION OF THE PREFERRED EMBODIMENTS

Figure 1:
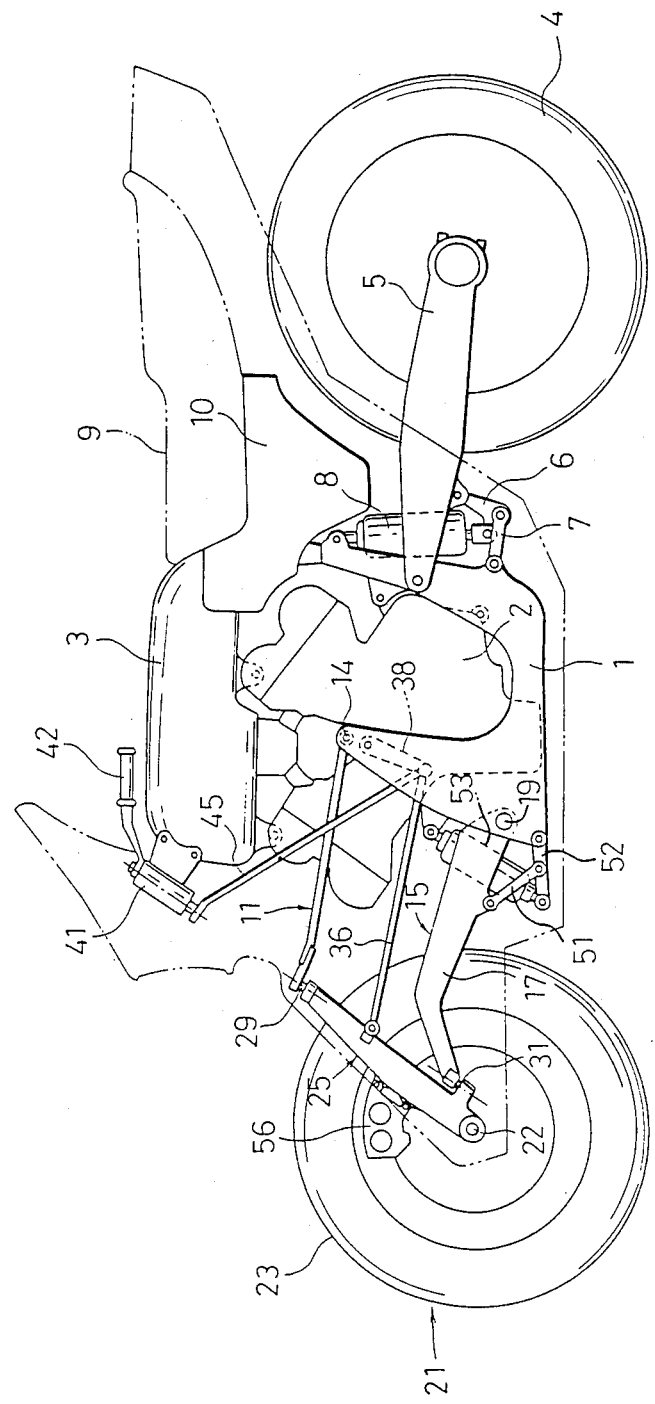
FIG. 1 is a plan view of a motorcycle comprising a suspension system constructed in accordance with the present invention.

Referring to FIG. 1, a vehicle comprising a suspension system built in accordance with the present invention includes a frame 1, a V-shaped engine 2, a gas tank 3, and a rear swing-arm 5 supporting a rear wheel 4. Situated between the rear swing-arm 5 and the lower end of the frame 1, are a bell crank 6 and a link 7. Extending between the bell crank 6 and the upper end of the frame 1 is a damper 8. Positioned behind the gas tank 3 are a seat 9 and an air cleaner case 10.

Figure 2:
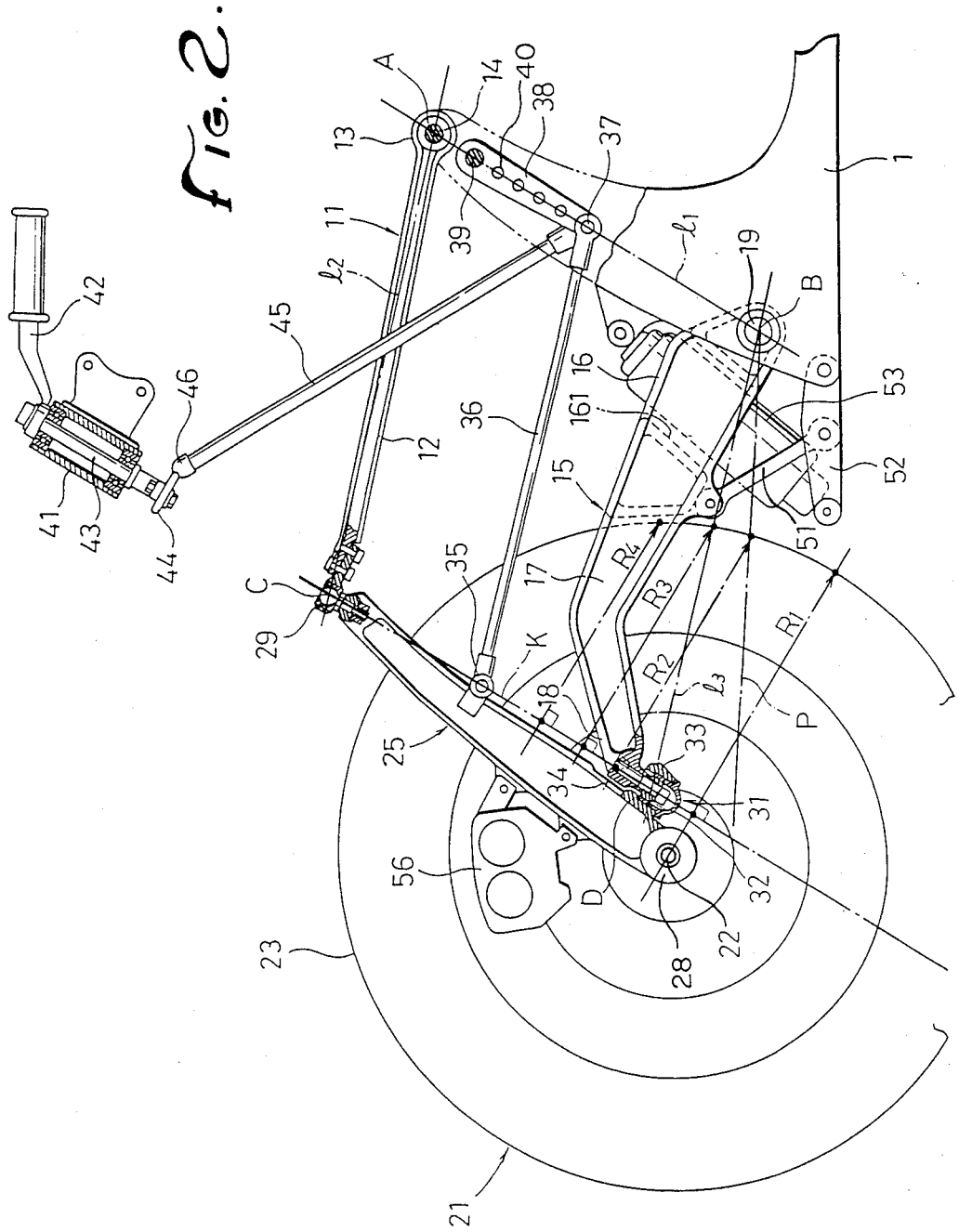
FIG. 2 is a detailed plan view of the vehicle of FIG. 1 showing the suspension system therein in greater detail.
Figure 3:
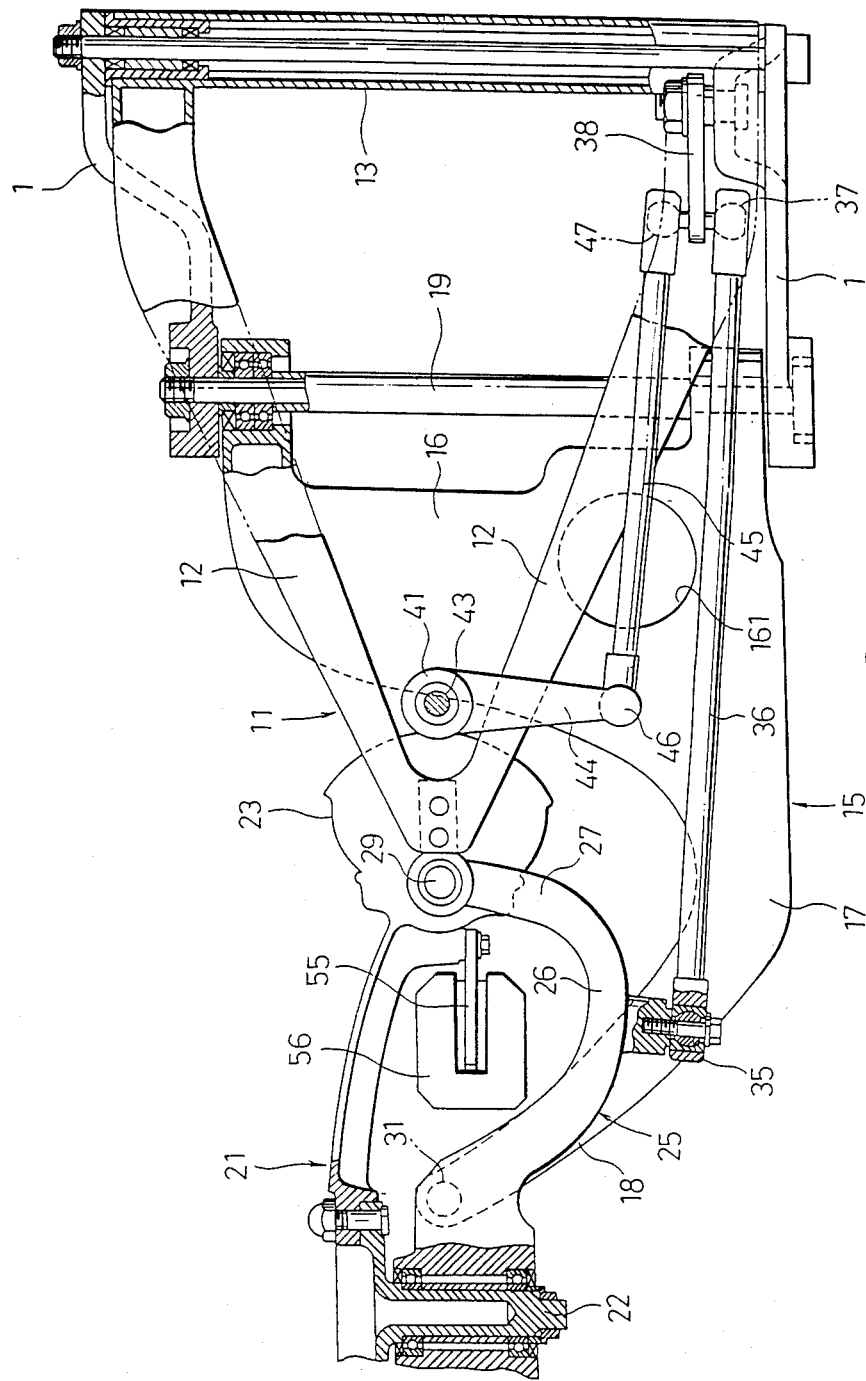
FIG. 3 is a top view of the suspension system of FIG. 2.

As shown in FIGS. 2 and 3, a pair of swing arms 11 and 15 extend forwardly from pivots 13 and 19 positioned at pivotal mounting locations A and B, respectively, on frame 1. The segment $L_1$, which links the mounting locations A and B between the upper arm 11 and the lower arm 15, slants downwardly and forwardly as shown in FIG. 2.

As can be seen in FIG. 3, the upper swing arm 11 is formed from a pair of side members 12 so as to be v-shaped. The lower swing arm 15 comprises a rearward widened portion 16, a middle portion 17 which is curved outwardly from the vehicle and a front portion 18 which curves back toward the vehicle. When seen from the side it will be seen that the lower swing arm 15 forms an apex at the middle portion 17 thereof, which is preferably located at approximately the circumference of the vehicle wheel 21. The term "approximately" means that the apex is at least adjacent the tire 23 of the wheel 21.

Mounted at the forward ends of the swing arms 11 and 15 is a steering arm 25. As shown in FIG. 3, the steering arm 25 includes a middle section 26 which extends away from the tire 21 and a upper portion 27 which extends back toward the upper end of the tire 23. An axle mounting portion 28 is adapted to support a wheel axle 22.

The forward end of the upper swing arm 11 is pivotally connected through a ball joint 29 to the top end of the steering arm 25. The forward end of the lower swing arm 15 is pivotally mounted at an area on the steering arm 25 above and rearwardly of the wheel axle 22 by means of a ball joint 31. The ball joint 31 comprises a ball 32 disposed in a socket 33 formed as part of a steering arm 25. A ball pivot 34, which comprises the forward end of the lower swing arm 15, is situated at the upper end of the socket 33. The ball 32 is located above and rearwardly of the wheel axle 22.

The points C and D represent the forward mounting locations of the upper and lower swing arms 11 and 15, respectively. The segment K, which represents the steering axis, links the connecting points C and D between the upper swing arm 11 and the lower swing arm 15. The segment K is parallel to the aforementioned segment $L_1$. In addition, segments $L_2$ and $L_3$, which connect the mounting locations A and C and B and D, respectively, are parallel to each other. Segments $L_2$ and $L_3$ extend forwardly and upwardly from the mounting locations A and B, respectively, when the motorcycle is in its normal operating position. Segments $L_1$, $L_2$, and $L_3$ and K form a parallelogram.

Figure 4:
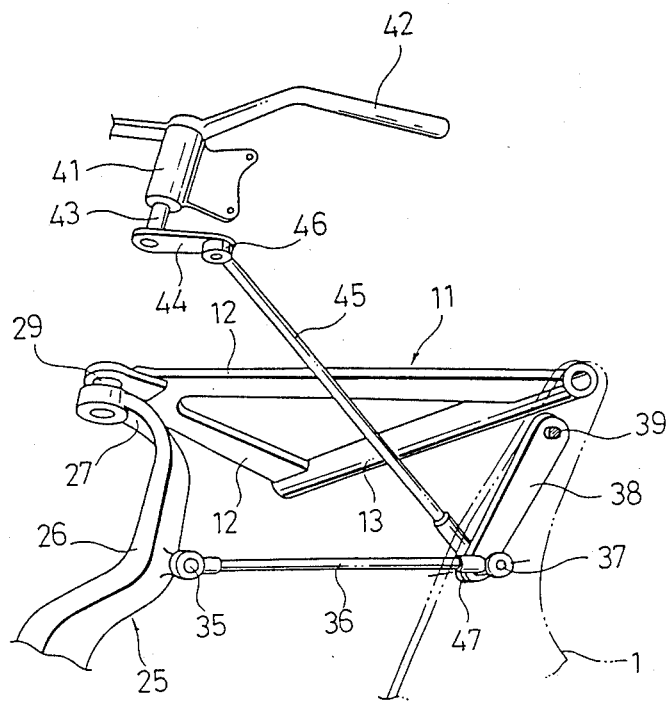
FIG. 4 is a detailed perspective view of a portion of a suspension system constructed in accordance with the present invention.

Turning to FIG. 4, a steering linkage extending between a vehicle steering control member 42 and the steering arm 25 is shown. The forward end of a tie rod 36 is pivotally connected to the middle portion 26 of the steering arm 25 through a ball joint 35 of conventional construction. The rearward end of the tie rod 36 is connected to a lever 38 through a ball joint 37 of conventional design. The lever 38 is pivotally mounted at the upper end thereof through a pivotal connection 39 located on the forward upper portion of the frame 1. A steering pipe 41 is situated in front of the gas tank 3 and the steering control member 42 is situated at the upper portion of the steering pipe 41. A steering stem 43 is disposed through the steering pipe 41 while a steering arm 44 extends from the lower end of the steering stem 43. A steering rod 45 extends from an end of the steering arm 44, where it is attached by a ball joint 46, to the lever 38, where it is attached by a ball joint 47. As shown in FIG. 2, the lever 38 can be provided with multiple mounting holes 40 to provide a selection of mounting locations for the rods 36 and 45, whereby the mechanical advantage of the steering linkage can be adjusted.

It will be observed that two links 51 and 52 are situated below the lower swing arm 15 in front of the frame 1. The link 52 is pivotally connected to the lower front portion of the frame 1 and extends forwardly therefrom. The link 51 is pivotally connected at one end to a central location on the link 52 and is pivotally connected at its other end at a central lower location on the lower swing arm 15. Pivotally mounted to the forward end of the link 52 is a damper 53 which extends from the link 52 to a mounting location at a forward central portion of the frame 1. The damper 53 extends through a hole 161 that is created in the rear portion 16 of the lower swing arm 15.

As shown in FIG. 3, a disk brake 55 and a caliper member 56 are provided on the wheel 21.

The lower swing arm 15 is situated at the side of the wheel 21 and the tire 23 where the radius created by the rotation of the tire 23 around the steering axis K is relatively small. Therefore, the lateral extension of the lower swing arm 15 to avoid interference with the tire 23 can be minimized. As shown in FIG. 2, $R_1$ is the largest radius created by the rotation of the front tire 23 around the steering axis K. P is an imaginary line indicating the position of lower swing arms of the prior art. $R_2$ is the radius created by the rotation of the front wheel 21 that must be accommodated in prior art's swing arms.

If the lower swing arm of the present invention where straight, the result of requiring the segment $L_3$ to extend forwardly and upwardly from the frame 1 would be that the lower swing arm 15 would only need to accommodate tire rotation at $R_3$. Because this radius $R_3$ is smaller than $R_2$, the lateral extension of the swing arm 15 necessary to accommodate the tire 23 is minimized. Therefore, the length of the swing arm 15 can be shortened and savings in weight and material realized.

In addition, further improvement may be achieved by providing the apex 17 in the lower swing arm 15. By virtue of the apex 17, the lower swing arm 15 is bent above the segment $L_3$ such that the radius created by rotation of the tire about the steering axis K which must be accommodated by the lower swing arm 15 is $R_4$. Thus, further weight and material savings are made possible.

Figure 5:
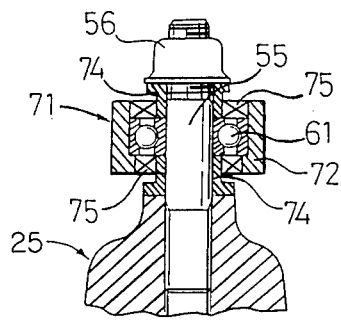
FIG. 5 is a detailed plan view of a second aspect of the suspension system of FIG. 2 showing an alternative mounting arrangement between the upper swing arm and the steering arm.
Figure 6:
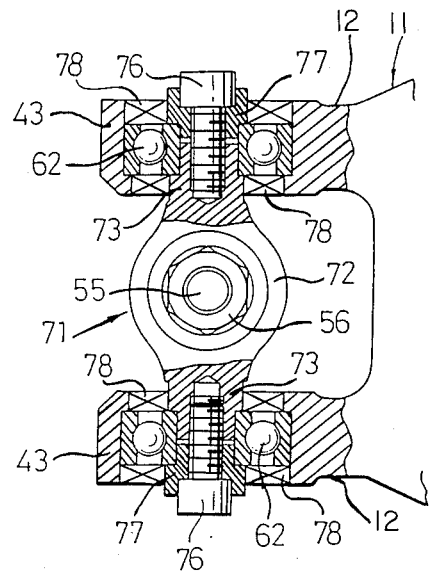
FIG. 6 is a top view of the mounting arrangement of FIG. 6.

FIGS. 5 and 6 show a second aspect of the pivotal mounting arrangement between the upper swing arm 11 and the steering arm 25. In this embodiment, the arm members 12 of the upper swing arm 11 are not joined at the central ball joint 29 but are configured to form a fork for the mounting of a cross joint member 71. As shown in FIG. 5, a stud bolt 55 is located above the steering arm 25 so that it is on the steering axis line K. The bolt 55 extends through a radial ball bearing 61, a central boss 72 of the cross joint member 71 and into the steering arm 25. A nut 56 secures the cross joint 71 in place on the stud bolt 55. A collar 74 and a seal 75 are also provided. The cross joint 71 has extensions 73 on both sides for mounting the cross joint 71 to the side members 12 of the upper swing arm 11. Bosses 43 are situated at the ends of the arm members 12 and the extensions 73 are connected thereto with radial ball bearings 62. Bolts 76 secure the cross joint 71 in place with collars 77 and seals 78 also being provided.

Figure 7:
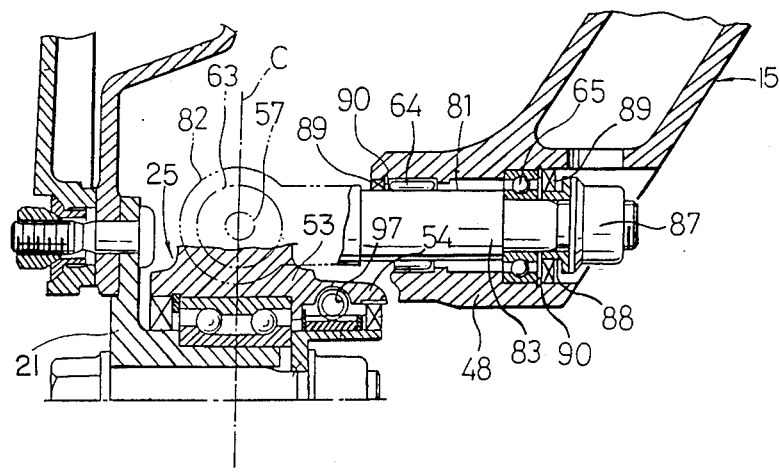
FIG. 7 is a detailed top view of a second aspect of the suspension system of FIG. 2 showing an alternative mounting arrangement between the lower swing arm and the steering arm.
Figure 8:
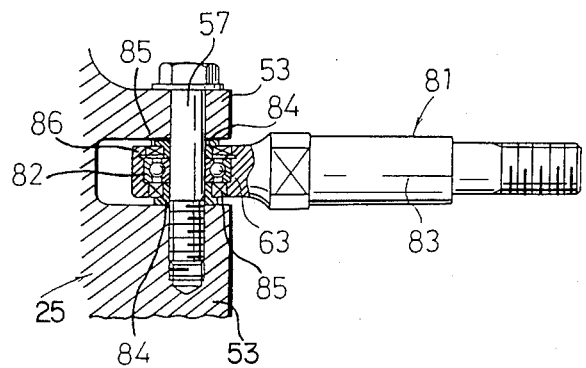
FIG. 8 is a plan view of the mounting arrangement of FIG. 7.

FIGS. 7 and 8 show a second aspect of the mounting arrangement between the lower swing arm 15 and the steering arm 25 comprising a cross joint member 81. A boss 53 is situated on the lower portion of the steering arm 25 rearwardly and above the axle 22. A bolt 57 is located on the steering axis line K and is connected into the boss 53. A boss 82 of the joint member 81, which extends latitudinally, is linked to the middle section of the bolt 57 with a radial ball bearing 63 there between. A collar 84, seals 85 and a clip 86 are also provided. The other end of the cross joint member 81 constitutes a journal portion 83. The joint member 81 is linked to the forward end portion of the lower swing arm 15 through the journal portion 83 so that the joint member 81 can rotate freely. A boss 48 is situated at the forward end of the lower swing arm 25 and the aforementioned journal portion 83 is linked inside the boss 48 by means of a needle bearing 64 and a radial ball bearing 65. A nut 87 is connected to the joint member 81 and a collar 88, seals 89, and clips 90 are also provided.

FIGS. 9 and 10 show a second aspect of the invention wherein the steering arm 25 comprises a forwardly offset portion 25a positioned at the forward mounting location D of the lower swing arm 15. Therefore, it is possible to link the forward portion of the lower swing arm 15 to the steering arm 25 without any interference. As a result, the offset e between the axle 22 and the steering axis line K is minimized. The caster trail T can be changed without changing the caster angle $\theta$. Also, the caster angle $\theta$ can be changed without changing the caster trail T. The alignment of the front wheel 13 can be performed with much more flexibility. In this embodiment, the value of the offset e is a positive one since the steering axis line K is placed behind the axle 22. But it is also possible to make this value e into a negative number by moving the forwardly offset portion 25a to the front. In this case, the steering axis line K is situated in front of the axle 22. Moreover, the distance between the axle 22 and the joint 31 is shortened because the joint 31 is located closer to the axle 22. Therefore, the lower swing arm 15 can be made lighter and sturdier since the lateral extension thereof required to avoid interference with the tire 21 can be reduced thereby allowing for weight reduction.

Thus, a steering mechanism for a vehicle has been disclosed wherein upper and lower swing arms are mounted at selected locations on a steering arm so as to achieve weight reduction in the system. While embodiments and applications of this invention have been shown and described, it would be apparent to those skilled in the art that many more modifications are possible without departing from the inventive concepts herein. The invention, therefore, is not to be restricted except on the spirit of the appended claims.

What is claimed is:

1. In a vehicle having a frame and a steerable front wheel positioned forwardly of said frame, a front suspension system for connecting said front wheel to said frame, comprising:
   an elongated steering arm positioned forwardly of said frame and rotatably mounting the axle of said front wheel;
   a pair of vertically spaced, substantially parallel upper and lower swing arms extending forwardly between said frame and said steering arm;
   pivot connections connecting the rearward ends of said swing arms to said frame and the forward ends thereof to said steering arm;
   said pivot connection connecting said forward end of said upper swing arm to said steering arm being outside the circumference of said front wheel;
   said pivot connection connecting said forward end of said lower swing arm to said steering arm being above and rearwardly of said front wheel axle; and
   said pivot connection connecting said rearward end of said lower swing arm to said frame being at a level below said front wheel axle, whereby said swing arms are inclined in an upward direction between said frame and said steering arm.

2. The suspension system set forth in claim 1 wherein a line connecting the pivot connections connecting the forward ends of said swing arms define the steering axis of said vehicle; said lower swing arm has an apex portion intermediate its ends; the portion of said lower swing arm rearwardly of said apex extending substantially perpendicularly to said vehicle steering axis; and the portion of said lower swing arm forwardly of said apex portion inclines downwardly toward said front wheel axle.

3. The suspension system set forth in claim 2 wherein said apex portion is located approximately at the circumference of said vehicle front wheel.

4. The suspension system set forth in claim 2 wherein said steering arm is offset forwardly of said front wheel axle adjacent the forward end of said lower swing arm.

5. The suspension system set forth in claim 2 wherein said forward end of said lower swing arm is laterally spaced from said steering arm and said pivot connection therebetween includes a cross joint member having one end connected to said steering arm for rotation about an axis perpendicular to said front wheel axle and the other end connected to said lower swing arm for rotation about an axis parallel to said front wheel axle.

6. A suspension system for a vehicle, comprising:
   a steering arm mounting an axle of a steerable front wheel;
   a pair of upper and lower swing arms;
   a plurality of forward and rearward pivot connections connecting opposite ends of said swing arms between said steering arm and said vehicle, respectively;
   said forward pivot connections defining a steering axis having a fixed caster angle;
   said upper swing arm extending linearly between said vehicle and said steering arm and connecting therewith outside the circumference of said front wheel; and
   said lower swing arm having a rearward portion extending substantially perpendicularly to said steering axis and connecting with said vehicle and a forward portion being downwardly inclined to connect with said steering arm.

7. The suspension system according to claim 6 including a speed meter gear box mounted on said steering arm.

* * * * *